Patented May 23, 1972  3,664,070

WILLIS W. GOLAY INVENTOR.

BY John W. Kraft

United States Patent
Golay

[15] 3,664,070
[45] May 23, 1972

[54] HAY COVERING
[72] Inventor: Willis W. Golay, Route 1, Kimberly, Idaho 83341
[22] Filed: Apr. 9, 1970
[21] Appl. No.: 26,991

[52] U.S. Cl. ................................................................52/4
[51] Int. Cl. ..............................................................E04d 1/34
[58] Field of Search ..............................................52/2–5, 23

[56] References Cited

UNITED STATES PATENTS

| 216,606 | 6/1879 | Davis | 52/4 |
| 1,187,210 | 6/1916 | Warner | 52/4 |
| 3,327,434 | 6/1967 | Martin | 52/3 |

FOREIGN PATENTS OR APPLICATIONS

| 137,598 | 1920 | Great Britain | 52/4 |
| 637,479 | 1950 | Great Britain | 52/4 |
| 159,037 | 1954 | Australia | 52/4 |

*Primary Examiner*—John E. Murtagh
*Attorney*—John W. Kraft

[57] ABSTRACT

A hay covering having a multiplicity of interlockingly engageable canopy portions. Each of the canopy portions is provided with frame portions suitably fastened to each of the canopy portions and distally disposed inwardly from each of the respective terminal ends thereof, each of the frame portions being shorter in length than the respective edges of the canopy. The frame portions are provided with a multiplicity of holes spaced apart at intervals. Retaining pins operable to be driven into bales of hay are provided. S-hooks commonly known are used and employed to engage preselected bales in the frame portions and respective retaining pins driven into bales of hay to fasten canopy portions to stacked bales of hay.

3 Claims, 5 Drawing Figures

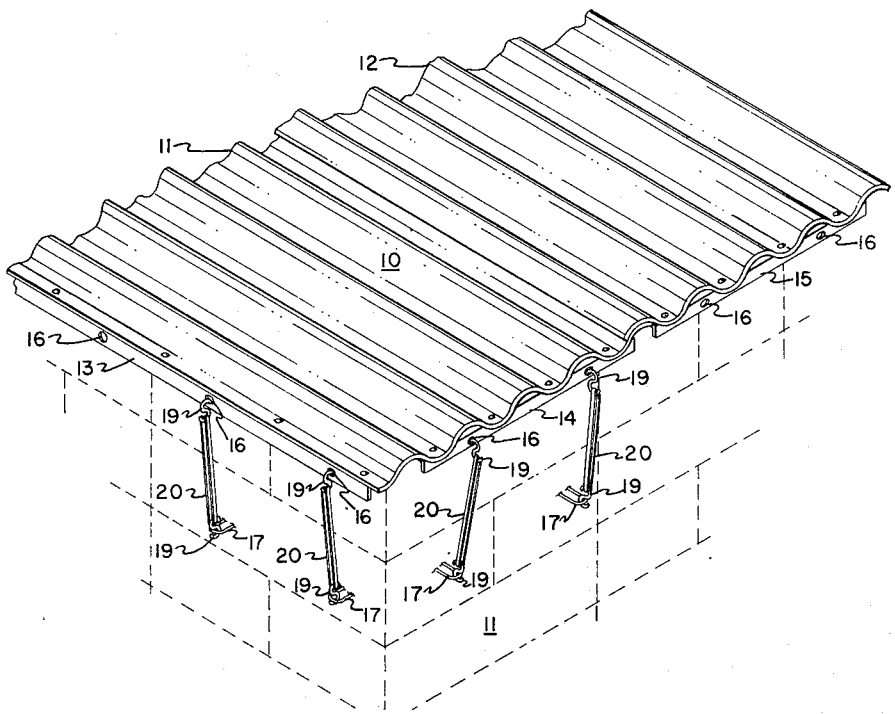

HAY COVERING

FIELD OF INVENTION

This invention relates to hay coverings and more particularly to hay coverings including a multiplicity of interlocking canopy portions operable to be fastened to bales of hay stacked together.

BRIEF DESCRIPTION OF THE PRIOR ART

Mounds and bales of hay stacked together have been variously covered with tarpaulins, canvas, plastic covers and the like to protect the hay from wind, rain and other elements which tend to destroy the hay. These means are usually tied to stakes driven into the ground. In areas having unusual winds at various seasons of the year such coverings tend to become torn and otherwise destroyed. In addition, access to a covered stack of hay is difficult.

Accordingly it is an object of this invention to provide a more rigid and durable cover for hay operable to withstand inclimate weather conditions.

Another object of this invention is to provide in a hay covering interlocking means by which the covering may be made to conform to the stack and to provide means for easy access to the stack.

These and other objects shall become apparent from the description following, it being understood that modifications may be made without affecting the teachings of the invention here set out.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
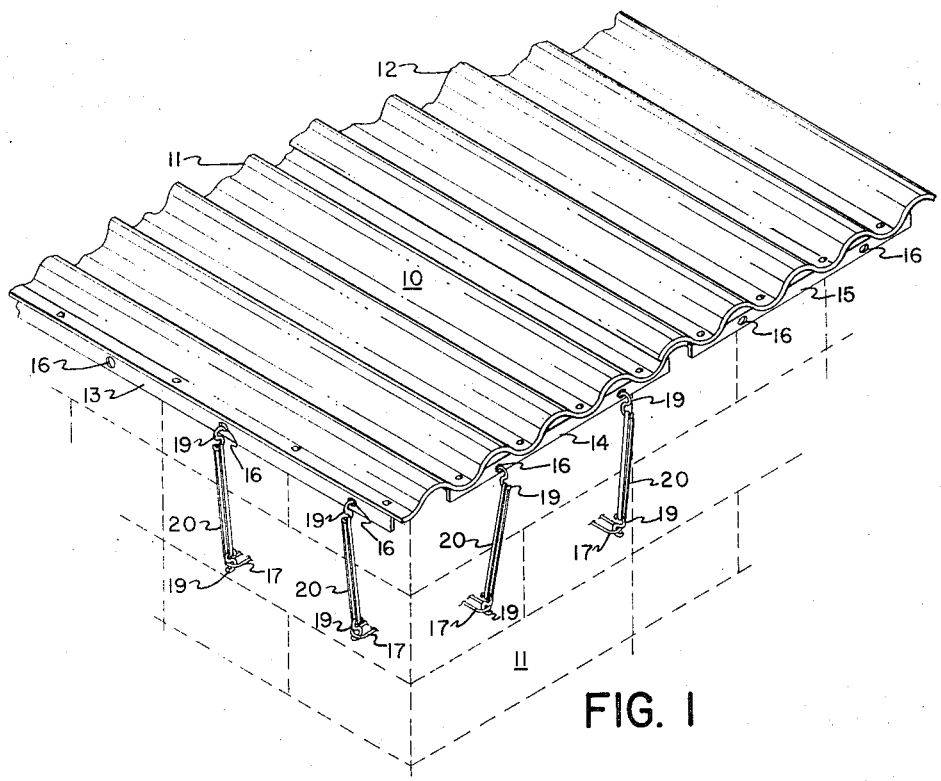
FIG. 1 is a top perspective view of the hay covering of this invention showing the covering in place over bales of hay stacked together.
Figure 2:
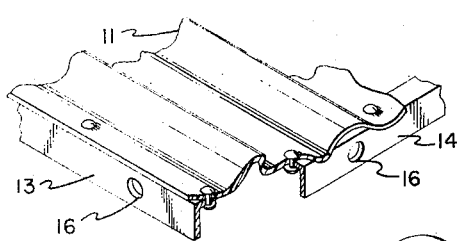
FIG. 2 is a broken perspective fragmentary view showing the frame of the canopy portions of this invention.
Figure 3:
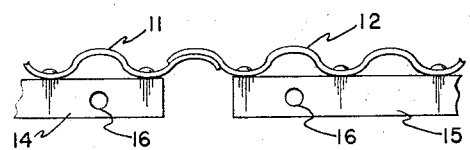
FIG. 3 is a fragmentary side elevational view of two canopy portions interlockingly engaged with one another.
Figure 4:
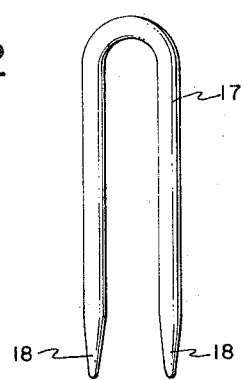
FIG. 4 is a side elevational view of a pin retaining means of this invention.
Figure 5:
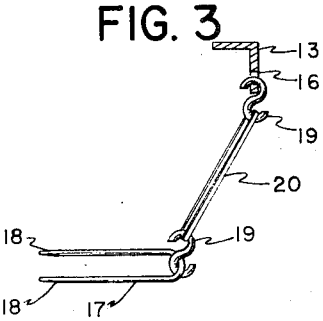
FIG. 5 is a cross sectional side elevational view showing one method of attaching the covering to the retaining means.

Referring now to the drawings and more particularly to the FIG. 1, the hay covering of the present invention is shown to advantage and generally identified by the numeral 10. The covering 10 is shown in place over a multiplicity of bales of hay 11 stacked together which are shown in dotted lines for illustrative purposes. The hay covering 10 includes a multiplicity of interlocking canopy members such as shown at 11 and 12 each of which are provided with frame members as shown at 13, 14 and 15. The frame members such as 13, 14 and 15 are suitably fastened to the canopy members 11 and 12 distally disposed inwardly from the respective terminal edges thereof. In practice, any number of canopy members such as 11 and 12 may have their respective terminal edges overlapped to form a covering over a hay stack. It may be observed in the FIGS. 1, 2 and 3 that the frame members 13, 14 and 15 are distally spaced inwardly from the terminal edges of the canopy members 11 and 12 and are shorter in length than the dimensional length of respective edges of canopy members 11 and 12, making it possible to overlap the respective canopy members. Each of the frame members 13, 14 and 15 are provided with a multiplicity of holes 16 spaced apart at intervals. A substantially U-shaped staple-like pin 17 having ends 18 sharpened to a point is provided. The pin 17 may be driven into the bales of hay. The pin 17 is shown to advantage in the FIG. 4. Commonly known S-hooks 19 may be used and employed to engage holes 16 in the canopy frames 13, 14 and 15 and the staple-like pins 18. In practice it has been found to advantage to engage a hook 19 in a hole 16, to engage another hook 19 in a pin 17 and connect the respective hooks 19 together with a flexible band 20 substantially as shown in the FIGS. 1 and 5. In this manner the pin 17 may be more securely fastened into the center of a bale, and therefore is less likely to be worked free thereof by wind acting upon the canopy 11 and 12.

Having thus described in detail a preferred apparatus which embodies the concepts and principles of the invention and which accomplishes the various objects, purposes and aims thereof, it is to be appreciated and will be apparent to those skilled in the art, that many physical changes could be made in the apparatus without altering the inventive concepts and principles embodied therein. Hence, it is intended that the scope of the invention be limited only to the extent indicated in the appended claims.

I claim:

1. A hay covering comprising the combination of a multiplicity of canopy portions having frame members distally disposed inwardly from each of the terminal edges of each of said canopy portions suitably fastened to said canopy portions, said frame members being shorter in length than the respective terminal edges of each of said canopy portions, each of said canopy portions being operable to overlappingly engage other of said canopy members, each of said frame members including a multiplicity of holes spaced apart at intervals, a plurality of pin retaining means operable to be driven into baled hay, a plurality of substantially S-shaped hooks each being operable to engage respective holes in said canopy frame members and in said pin retaining means, means connecting said respective S-shaped hooks.

2. The combination of claim 1 in which said pin retaining means is a substantially U-shaped staple-like pin.

3. The combination of claim 2 wherein one of said S-shaped hooks engages a preselected hole in said frame and another said S-shaped hook engages one of said pins, and said connecting means comprising a flexible band member engaging each of the respective hooks.

* * * * *